(12) United States Patent
Winterton et al.

(10) Patent No.: US 6,451,871 B1
(45) Date of Patent: Sep. 17, 2002

(54) METHODS OF MODIFYING SURFACE CHARACTERISTICS

(75) Inventors: Lynn Cook Winterton, Alpharetta, GA (US); Juergen Vogt, Fribourg (CH); John Martin Lally, Lilburn, GA (US); Friedrich Stockinger, Courtepin (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/559,945

(22) Filed: Apr. 27, 2000

Related U.S. Application Data

(62) Division of application No. 09/199,609, filed on Nov. 25, 1998, now abandoned.

(51) Int. Cl.$^7$ .............................. G02C 7/04; G02C 7/02
(52) U.S. Cl. .................... 523/106; 264/1.32; 427/2.24; 427/162; 523/105; 523/107; 523/108; 623/6.11
(58) Field of Search ............................... 427/2.24, 162; 623/6.11; 264/1.32; 523/105, 106, 107, 108

(56) References Cited

U.S. PATENT DOCUMENTS

| | | | |
|---|---|---|---|
| 4,168,112 A | 9/1979 | Ellis et al. | 351/160 |
| 4,321,261 A | 3/1982 | Ellis et al. | 424/180 |
| 4,941,997 A | 7/1990 | Decher et al. | 252/586 |
| 4,973,429 A | 11/1990 | Decher et al. | 252/587 |
| 5,068,318 A | 11/1991 | Decher et al. | 534/573 |
| 5,208,111 A | 5/1993 | Decher et al. | 428/420 |
| 5,518,767 A | 5/1996 | Rubner et al. | 427/259 |
| 5,529,727 A | 6/1996 | LaBombard | 264/1.36 |
| 5,536,573 A | 7/1996 | Rubner et al. | 428/378 |
| 5,700,559 A | * 12/1997 | Sheu et al. | 428/407 |
| 6,011,082 A | 1/2000 | Wang | 523/107 |

FOREIGN PATENT DOCUMENTS

| | | |
|---|---|---|
| EP | 0 032 443 A2 | 1/1981 |
| EP | 0 138 385 A2 | 9/1984 |
| GB | 2102070 | 1/1978 |
| JP | 01158412 | 2/1980 |
| JP | 05318118 | 3/1993 |
| WO | WO 95/00618 | 1/1995 |
| WO | WO 95/02251 | 1/1995 |
| WO | WO 95/20407 | 8/1995 |
| WO | WO 96/37241 | 4/1996 |
| WO | WO 96/18498 | 6/1996 |
| WO | WO 96/31792 | 10/1996 |

OTHER PUBLICATIONS

New nanocomposite flims for bio–sensors: layer by layer adsorbed films of polyelectrolytes, proteins or DNA. By Gero Decher, Birgit Lehr, Klaus Lowack, Yuri Lvov & Johannes Schmitt. ; 1994 Elsevier Science LTD.

Assembly of polyelectrolyte multilayer films by consecutively alternating adsorption of polynucleotides and polycations. By G.B. Surhorukov, H. Mohwald, G. Decher and Y.M. Lvov. ; 1996 Elsevier Sciences.

Blood Capatibility–Surface Characteristic Relationships of a Langmuir–Blodgett Film Composed of an Anionic Amphiphile–Polycation Complex, Uchida M., et al., New Polymers Material, vol. 4, No. 3 pp. 119–211 (1994).

Enhancement of Light Emitting Diodes Based on Self–Assembled Heterosctructures of Poly (P–phenylene vinylene), O. Onitsuka, et al., Journal Applied Physics, 80, (7), Oct. 1, 1996, pp. 4067–4071.

Investigations of New Self–Assembled Multilayer Thin Films Based on Alternately Absorbed Layers of Polyelectrolytes and Functional Dye Molecules, D. Yoo, et al., Material Resource, Soc. Symp. Proc. vol. 413, 1996, Materials Research Society.

New Electro–Active Self–Assembled Multilayer Thin Films Based on Alternately Absorbed Layers of Polyelectrolytes and Functional Dye Molecules, D. Yoo, et al., Elsevier Science, S.A., 1977, pp. 1425–1426.

Layer–By–Layer Modification of Surfaces Through the Use of Self–Assembled Monolayers of Polyions, D. Yoo, et al., ANTEC, 1995 pp. 2568–2570.

Molecular Self–Assembly of Conducting Polymers: A New Layer–by–Layer Think Film Deposition Process, J. H. Chung, et al.

Patterned Polymer Multilayer Fabrication by Controlled Adhesion of Polyelectrolytes to Plasma–Modified Fluoropolymer Surfaces, T. G. Vargo, et al, Supramolecular Science, vol. 2, No. 3–4, 1995, pp. 169–174.

Molecular–Level Processing of Conjugated Polymers 1. Layer–by–Layer Manipulation of Conjugated Polyions, M. Ferreira, et al., Macromolecules, vol. 28, No. 21, 1995, pp. 7107–7114.

Molecular–Level Processing of Conjugated Polymers 2. Layer–by–Layer Manipulation of In–Situ Polymerized p–type Doped Conductiong Polymers, M. Ferreira, et al., Macromolecules, vol. 28, No. 21, 1995, pp. 7115–7120.

Molecular–Level Processing of Conjugated Polymers 3. Layer–by–Layer Manipulation of of Ppolyaniline via Electrowstatic Interactions, J. H. Cheung, et al., Macromolecules, 1997, 30, pp. 2712–2716.

\* cited by examiner

Primary Examiner—Peter Szekely
(74) Attorney, Agent, or Firm—R. Scott Meece; Robert Gorman; Richard I. Gearhart

(57) ABSTRACT

Biomedical devices, such as ophthalmic lenses, and methods of making such devices having a surface coating including at least one polyionic layer. A preferred method involves spray coating a polycationic material onto a core lens, rinsing and drying the lens, followed by spray coating a polyanionic material, rinsing and drying. The coating process may be applied a plurality of times to achieve a multi-layer coating on the lens surface. A particularly preferred embodiment is a contact lens comprising a highly oxygen permeable hydrophobic core coated with a 5 to 20 bilayers of hydrophilic polyionic materials.

16 Claims, No Drawings

METHODS OF MODIFYING SURFACE CHARACTERISTICS

This application is a divisional application of application Ser. No. 09/199,609, filed Nov. 25, 1998, now abandoned; which application claimed priority to provisional application Ser. No. 60/135,513, which was converted to a provisional application by petition from non-provisional application Ser. No. 09/005,317, filed Jan. 9, 1998.

BACKGROUND OF THE INVENTION

1. Field of the Invention

The invention relates to surface treatment technology for biomedical devices, and in particular, methods of altering the hydrophobic or hydrophilic nature of the polymeric surface of an ophthalmic lens such as a contact lens. In one preferred embodiment, this invention relates to methods of treating biomedical devices, such as contact lenses, to increase the hydrophilicity of the surface.

2. Description of the Related Art

Many devices and materials used in various biomedical applications require certain properties in the bulk of the device or material with distinct and separate properties required for the surface. For example, contact lenses preferably have high oxygen permeability through the lens to maintain good corneal health, but the materials which typically exhibit exceptionally high oxygen permeability (e.g. polysiloxanes) are hydrophobic and will adhere to the eye. Thus, a contact lens may have a core or bulk material which is highly oxygen permeable and hydrophobic, and a surface which has been treated or coated to increase the hydrophilicity, thereby allowing the lens to freely move on the eye.

In order to modify the hydrophilicity of the a relatively hydrophobic contact lens material, a contact lens may be treated with a plasma treatment. A high quality plasma treatment technique is disclosed in PCT Publication No. WO 96/31792 by inventors Nicolson, et al. However, some plasma treatment processes require significant investment in equipment. Moreover, plasma treatment requires that the lens be dry before exposure to the plasma. Thus, lenses which are wet from prior hydration or extraction processes must be dried, imposing costs of drying equipment and adding time to the overall lens production process. Accordingly, there remains a need for an inexpensive method of consistently and permanently altering the surface properties of polymeric biomaterials, especially ophthalmic lenses such as contact lenses. A particularly preferred method would be one which could be used directly on wet lenses, i.e., without requiring a preliminary drying step.

In contrast to the plasma surface treatment methods used in the ophthalmic lens art, a number of techniques have been used to treat the surface of electronic devices, thin film sensors and the like. These techniques include Langmuir-Blodgett deposition, controlled spin casting, chemisorptions and vapor deposition. Useful examples of Langmuir-Blodgett layer systems are disclosed in U.S. Pat. Nos. 4,941,997; 4,973,429 and 5,068,318 issued to Decher, et al., and assigned to Ciba-Geigy Corporation. A more recent technique used on electronic devices is a layer-by-layer polymer adsorption process which is described in *"Investigations of New Self-Assembled Multilayer Thin Films Based on Alternately Adsorbed Layers of Polyelectrolytes and Functional Dye Molecules"* by Dongsik Yoo, et al. (1996).

The Yoo, et al. process involved alternatively dipping hydrophilic glass substrates in a polyelectrolyte solution (e.g., polycations such as polyallylamine or polyethyleneimine) and an oppositely charged dye solution to form electrically conducting thin films and light-emitting diodes (LEDs). After each dipping, the substrates were rinsed with acidic aqueous solutions. Both the dipping and rinsing solutions had a pH of 2.5 to 7. Prior to dipping, the surfaces of the glass substrates were treated in order to create a surface having an affinity for the polyelectrolyte.

Similarly, two 1995 publications entitled *"Molecular-Level Processing of Conjugated Polymers"* by Fou and Rubner and by Ferreira and Rubner, describe similar methods of treating glass substrates which have hydrophilic, hydrophobic, negatively or positively charged surfaces. The glass surfaces are treated in hot acid baths followed by hot peroxide/ammonia baths for extended periods to produce a hydrophilic surface. Hydrophobic surfaces are produced by gas-phase treatment in 1,1,1,3,3,3-hexamethyldisilazane for 36 hours. Charged surfaces were prepared by covalently anchoring charges onto the surface of the hydrophilic slides. For example, positively charged surfaces were made by further treating the hydrophilic surfaces in methanol, methanol/toluene and pure toluene rinses followed by immersion in (N-2-aminoethyl-3-aminopropyl) trimethyloxysilane solution for 12–15 hours. This procedure produced glass slides with amine functionalities, which are positively charged at low pH. All of the substrate surface preparations require chemical processing and are time consuming.

U.S. Pat. Nos. 5,518,767 and 5,536,573 issued to Rubner, et al. and assigned to Massachusetts Institute of Technology, describe methods of producing bilayers of p-type doped electrically conductive polycationic polymers and polyanions or water-soluble, non-ionic polymers on glass substrates. Extensive chemical pretreatments of the glass substrates, which are the same or similar to those taught in the aforementioned articles, are described in the '767 and '573 patents.

The layer-by-layer polyelectrolyte deposition methods described in patent and literature references relate generally to production of electronic devices and treatment of rigid glass substrates. Notably, the teachings indicate that complex and time-consuming pretreatment of the substrate is required to produce a surface having a highly charged, hydrophilic or hydrophobic nature in order to bind the polycationic or polyanionic material to the glass substrate.

SUMMARY OF THE INVENTION

An object of the invention is to provide a method of treating polymers, in particular ophthalmic lenses, to alter surface properties.

Another object of the invention is to reduce the complexity of ophthalmic lens production processes.

A further object of the invention is to provide contact lenses having a balance of excellent oxygen permeability though the lens and sufficient hydrophilicity on the surface to permit free movement of the lens when positioned on the eye of a wearer.

Yet another object of the invention is to reduce to the material and manpower costs of producing high quality contact lenses.

Still a further object of the invention is to provide a method of altering the surface properties of a wet ophthalmic lens without requiring a prior drying step.

The aforementioned objects and other advantages of the invention are apparent from the following summary and detailed description of the invention.

One embodiment of the invention is a polymeric device, preferably a biomedical device, comprising a core material and a surface coating. The surface coating includes at least one bilayer of polyelectrolytes. The bilayer includes a first polyionic material which is bonded to the core material and a second polyionic material, having charges opposite of the charges of the first polyionic material, which is bonded to the first polyionic material.

Another embodiment of the invention is a method producing a biomedical device having a core material and a surface coating including at least one bilayer of polyionic materials, including the steps of contacting a core material with a first polyionic material, thereby bonding said polyionic material to said core material to form a coated biomedical device; and contacting said coated device with a second polyionic material having charges opposite of the charges of said first polyionic material, thereby forming a biomedical device having a polyionic bilayer.

A group of preferred core materials are those having no substantial surface charge density. A preferred biomedical device is an ophthalmic lens, especially a contact lens.

Still Another embodiment of the invention is a fixture for supporting an article, including a core material having a disperse plurality of transitory or permanent charges on or near the surface of the material and a surface coating, including a polyionic material which is bonded to the core material.

A further embodiment of the invention is a mold for manufacturing an article, which includes a core material having a disperse plurality of transitory or permanent charges on or near the surface of the material and a surface coating, including a polyionic material which is bonded to the core material.

Yet a further embodiment of the invention is a method of forming an article and coating the article by transfer grafting a coating material from the mold in which the article was produced, comprising the steps of (a) applying a coating of a polyionic material to a mold, (b) dispensing a liquid molding material into the mold, (c) allowing the mold coating to transfer from the mold to the molding material, and (d) causing the liquid mold material to harden (e.g., by polymerization) to form a solid molded article having a polyionic coating.

Still another embodiment of the invention is a method of altering the surface of an article, including the steps of (a) applying to an article a coating of a polyionic material including functional groups and (b) contacting the coated article with a material reactive to the functional groups to graft the material onto the polyionic coating.

DESCRIPTION OF THE PREFERRED EMBODIMENTS

Embodiments of the present invention include a biomedical device, such as an ophthalmic lens, having a polyelectrolyte surface treatment and a method of applying the surface treatment to a biomedical device. A particularly preferred embodiment is an contact lens having a highly oxygen permeable hydrophobic core and a hydrophilic surface or surfaces. In order to better clarify the technology, certain terms will be defined before describing the details of the invention.

The term "biomedical device", as used herein, includes a wide variety of devices used in the biological, medical or personal care industries. Biomedical devices include, without limitation thereto, ophthalmic lenses, drug delivery devices such as oral osmotic devices and transdermal devices, catheters, contact lens disinfection and cleaning containers, breast implants, stents, artificial organs and tissue and the like.

"Ophthalmic lenses", as used herein, refers to contact lenses (hard or soft), intraocular lenses, eye bandages and artificial corneas. In a preferred embodiment, an "ophthalmic lens" refers to lenses which are placed in intimate contact with the eye or tear fluid, such as contact lenses for vision correction (e.g., spherical, toric, bifocal), contact lenses for modification of eye color, ophthalmic drug delivery devices, ocular tissue protective devices (e.g., ophthalmic healing promoting lenses), and the like. A particularly preferred ophthalmic lens is an extended-wear contact lens, especially extended-wear contact lenses for vision correction.

"Hydrophilic", as used herein, describes a material or portion thereof which will more readily associate with water than with lipids. A "hydrophilic surface", as used herein, refers to a surface which is more hydrophilic (i.e., more lipophobic) than the bulk or core material of an article. Thus, an ophthalmic lens having a hydrophilic surface describes a lens having a core material having a certain hydrophilicity surrounded, at least in part, by a surface which is more hydrophilic than the core.

"Polyion" or "polyionic material", as used herein, refers to a polymeric material including a plurality of charged groups, which includes polyelectrolytes, p- and n-type doped conducting polymers. Polyionic materials include both polycations (having positive charges) and polyanions (having negative charges).

I. Coating Processes and Materials

A. Coating Processes

One embodiment of the invention is a method producing an ophthalmic lens having a core material and a surface coating including at least one bilayer of polyionic materials, including the steps of contacting a core lens with a first polyionic material, thereby bonding the polyionic material to the core lens to form a coated lens; and contacting the coated lens with a second polyionic material having charges opposite of the charges of the first polyionic material, thereby forming a contact lens having a polyelectrolyte bilayer.

Application of the coating may be accomplished in a number of ways. One coating process embodiment involves solely dip-coating and dip-rinsing steps. Another coating process embodiment involves solely spray-coating and spray-rinsing steps. However, a number of alternatives involves various combinations of spray- and dip-coating and rinsing steps may be designed by a person having ordinary skill in the art.

One dip-coating alternative involves the steps of applying a coating of a first polyionic material to a core lens by immersing said lens in a first solution of a first polyionic material; rinsing the lens by immersing the lens in a rinsing solution; and, optionally, drying said lens. This procedure is then repeated using a second polyionic material, with the second polyionic material having charges opposite of the charges of the first polyionic material, in order to form a polyionic bilayer.

This bilayer formation process may be repeated a plurality of times in order to produce a thicker lens coating. A preferred number of bilayers is about 5 to about 20 bilayers. A more preferred number of bilayers is about 10 to about 15 bilayers. While more than 20 bilayers are possible, it has been found that delamination may occur in coatings having an excessive number of bilayers.

The immersion time for each of the coating and rinsing steps may vary depending on a number of factors. Preferably, immersion of the core material into the polyionic solution occurs over a period of about 1 to 30 minutes, more preferably about 2 to 20 minutes, and most preferably about 1 to 5 minutes. Rinsing may be accomplished in one step, but a plurality of rinsing steps has been found to be quite efficient. Rinsing in a series of about 2 to 5 steps is preferred, with each immersion into the rinsing solution preferably consuming about 1 to about 3 minutes.

Another embodiment of the coating process involves a series of spray coating techniques. The process generally includes the steps of applying a coating of a first polyionic material to a core lens by contacting the lens with a first solution of a first polyionic material; rinsing the lens by spraying the lens with a rinsing solution; and, optionally, drying the lens. Similar to the dip-coating process, the spray-coating process may then be repeated with a second polyionic material, with the second polyionic material having charges opposite of the charges of the first polyionic material.

The contacting of lens with solution, either polyionic material or rinsing solution, may occur by a variety of methods. For example, the lens may be dipped into both solutions. One preferred alternative is to apply the solutions in an spray or mist form. Of course, various combinations may be envisioned, e.g., dipping the lens in the polyionic material followed by spraying the rinsing solution.

The spray coating application may be accomplished via a number of methods known in the art. For example, a conventional spray coating arrangement may be used, i.e., the liquid material is sprayed by application of fluid, which may or may not be at elevated pressure, through a reduced diameter nozzle which is directed towards the deposition target.

Another spray coating technique involves the use of ultrasonic energy, e.g., wherein the liquid is atomized by the ultrasonic vibrations of a spray forming tip and thereby changed to a spray, as in U.S. Pat. No. 5,582,348, which is incorporated herein by reference.

Yet another method is electrostatic spray coating in which a charge is conveyed to the fluid or droplets to increase the efficiency of coating, one example of which is described in U.S. Pat. No. 4,993,645, which is hereby incorporated by reference.

A further method of atomizing liquid for spray coating involves purely mechanical energy, e.g. via contacting the liquid with a high speed reciprocating member or a high speed rotating disk, as in U.S. Pat. No. 4,923,123, which is incorporated herein by reference.

Still another method of producing microdroplets for spray coatings involves the use of piezoelectric elements to atomize the liquid. Examples of spray coating techniques and devices employing piezoelectric elements are given in U.S. Pat. Nos. 5,530,465, 5,630,793 and 5,624,608, all of which are incorporated by reference.

Some of the previously-described techniques may be used with air assist or elevated solution pressure. In addition, a combination of two or more techniques may prove more useful with some materials and conditions.

A preferred method of spray application involves dispensing the polyanion or polycation solution using a metering pump to an ultrasonic dispensing head. The polyion layer is sprayed so as to allow the surface droplets to coalesce across the material surface. The "layer" may then be allowed to interact for a period of time or immediately rinsed with water or saline rinse (or other solution devoid of polyanion or polycation).

A person having ordinary skill in the art will be able to select one or more spray coating methods without undue experimentation given the extensive teachings provided herein. Accordingly, the invention is not limited to the particular spray coating technique which is employed.

B. Coating Materials

1. Polyionic Materials

A preferred fist polyionic material is a polycationic material, i.e., a polymer having a plurality of positively charged groups along the polymer chain. For example, polycationic materials may be selected from the group consisting of:

(a) poly(allylamine hydrochloride) (PAH)

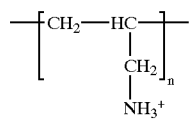

(b) poly(ethyleneimine) (PEI)

(c) poly(vinylbenzyltriamethylamine) (PVBT)

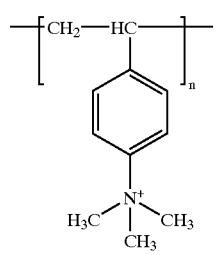

(d) polyaniline (PAN or PANI) (p-type doped) [or sulphonated polya niline

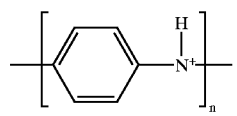

(e) polypyrrole (PPY) (p-type doped)

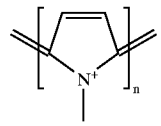

(f) poly(pyridinium acetylene)

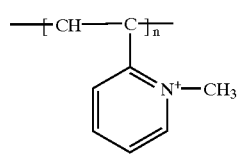

A preferred second polyionic material is a polyanionic material, i.e., a polymer having a plurality of negatively charged groups along the polymer chain. For example, polyanionic materials may be selected from the group consisting of (a) polymethacrylic acid (PMA)

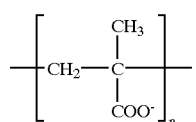

-continued (b) polyacrylic acid (PAA)

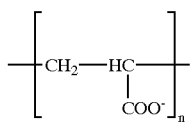

(c) poly(thiophene-3-acetic acid) (PTAA)

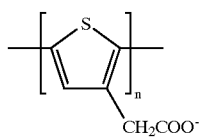

(d) poly(4-styrenesulfonic acid) or sodium poly(styrene sulfonate) (PSS or SPS)

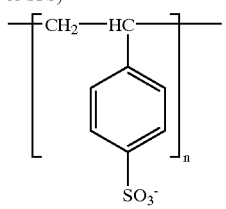

The foregoing lists are intended to be exemplary, but clearly are not exhaustive. A person having ordinary skill in the art, given the disclosure and teaching herein, would be able to select a number of other useful polyionic materials.

The molecular weight of the polyionic materials may be varied in order to alter coating characteristics, such as coating thickness. As the molecular weight is increased, the coating thickness generally increases. However, as molecular weight increases, the difficulty of handling increases. In order to achieve a balance of coating thickness and material handling, the polyionic materials preferably have a number average molecular weight of about 10,000 to about 150,000. More preferably, the molecular weight $M_n$ is about 25,000 to about 100,000, and even more preferably 75,000 to 100,000.

2. Polyallyl Amines

A particularly preferred set of polyionic materials useful in accordance with the present invention are derivatives of a polyallyl amine having a weight average molecular weight of at least 2000 that, based on the number of amino groups of the polyallyl amine, comprises from approximately 1 to 99% of units of formula

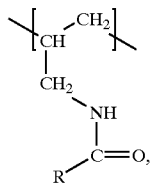

(1)

wherein R is $C_2$–$C_6$-alkyl which is substituted by two or more same or different substituents selected from the group consisting of hydroxy, $C_2$–$C_5$-alkanoyloxy and $C_2$–$C_5$-alkylamino-carbonyloxy. R is preferably linear $C_3$–$C_6$-alkyl, more preferably linear $C_4$–$C_5$-alkyl, and most preferably n-pentyl which is in each case substituted as defined above.

Suitable substituents of the alkyl radical R are —OH, a radical —O—C(O)—R, and/or a radical —O—C(O)—NH—$R_1'$ wherein $R_1$ and $R_1'$ are each independently of the other $C_1$–$C_4$-alkyl, preferably methyl, ethyl or n- or iso-propyl, and more preferably methyl or ethyl. Preferred substituents of the alkyl radical R are hydroxy, acetyloxy, propionyloxy, n- or iso-butanoyloxy, methylaminocarbonyloxy or ethylaminocarbonyloxy, especially hydroxy, acetyloxy or propionyloxy and in particular hydroxy.

A preferred embodiment of the invention relates to units of formula (1), wherein R is linear $C_p$-alkyl comprising p same or different above-mentioned substituents, and p is 2, 3, 4, 5 or 6, preferably 4 or 5 and in particular 5. R is even more preferred $C_p$-alkyl comprising p hydroxy groups which may be partly or completely acetylated, and p is 4 or 5, in particular 5. Particular preferred radicals R are 1,2,3,4,5-pentahydroxy-n-pentyl or 1,2,3,4,5-pentahydroxy-n-pentyl wherein the hydroxy groups are partly or completely acetylated.

The polymers of the invention are derivatives of a polyallyl amine that, based on the number of amino groups of the polyallyl amine, comprise from about 1 to 99%, preferably from 10 to 80%, more preferably, from 15 to 75%, even more preferably 20 to 70% and in particular 40 to 60%, of units of formula (1). The polymers of the invention are advantageously water-soluble.

A preferred group of polyallyl amine polymers comprise at least 1%, more preferably at least 5% and most preferably at least 10%, of units of formula (1a), based on the number of amino groups of the polyallyl amine.

A preferred group of polyallyl amine polymers have a weight average molecular weight of, for example, from 2000 to 1000000, preferably from 3000 to 500000, more preferably from 5000 to 150000 and in particular from 7500 to 100000.

The polyallyl amine polymers may be prepared in a manner known per se. For example, a polyallyl amine having a weight average molecular weight of at least 2000 that comprises units of the above formula (1a), may be reacted with a lactone of formula

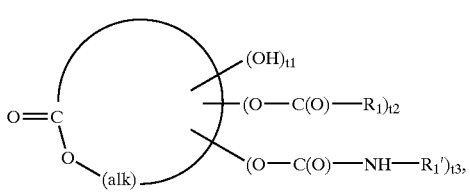

(6)

wherein (alk) is linear or branched $C_2$–$C_6$-alkylene, the sum of (t1+t2+t3) is at least 1, and $R_1$ and $R_1'$ are as defined above, to yield a polyallyl amine polymer comprising units of formula (1) and (1a).

The reaction between the polyallyl amine and the lactone may be performed in a manner known per se; for example, the polyallyl amine is reacted with the lactone in an aqueous medium at a temperature from about 20 to 100° C. and preferably 30 to 60° C. The ratio of units of formula (1) and (1a) in the final polymer is determined by the stoichiometry of the reactants. The lactones of formula (6) are known or may be prepared according to known methods. Compounds of formula (6) wherein t2 or t3 is ≧1 are for example available by reacting the respective hydroxy compound of formula (6) with a compound $R_1$—C(O)X or $R_1'$—NCO under conditions well-known in the art. Polyallyl amine starting materials of different molecular weights are commercially available e.g. in form of the hydrochloride. Said hydrochloride is converted previously into the free amine, for example, by a treatment with a base, for example with sodium or potassium hydroxide solution.

Polyallyl amines comprising additional modifier units may be prepared by adding to the reaction mixture of the polyallyl amine and the compound of formula (6) simultaneously or preferably successively one or more different compounds, for example, from the group of

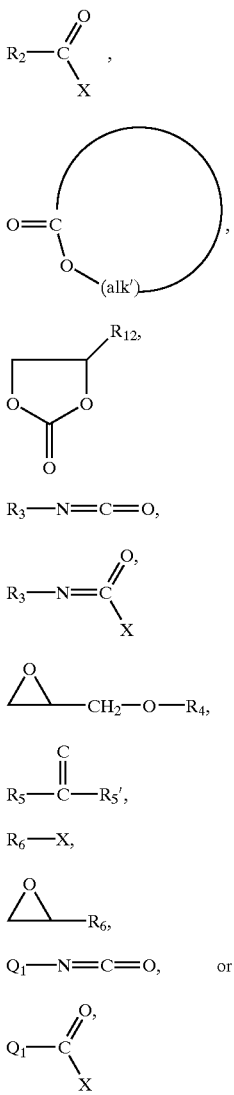

(6a)

(6b)

(6c)

(6d)

(6e)

(6f)

(6g)

(6h)

(6i)

(6j) or (6k)

wherein X is halogen, preferably chlorine, (alk') is $C_1$–$C_{12}$-alkylene, $R_{12}$ is hydrogen or $C_1$–$C_2$-alkyl, preferably hydrogen or methyl, and $R_3$, $R_4$, $R_5$, $R_5'$, $R_6$ and $Q_1$ are as defined above. The reaction proceeds, for example, in an aqueous solution at room temperature or at elavated temperature of for example 25 to 60° C. and yields polymers comprising units of formula (2a) [with compounds of formulae (6a), (6b) or (6c)], units of formula (2b) [with compounds of formulae (6d), (6e)], units of formula (2c) [with compounds of formula (6f)], units of formula (2d) [with compounds of formula (6g)] or units of formula (2e) [with compounds of formulae (6h), (6i), (6j) (6k)].

Since the reaction of the amino groups of the polyallyl amine with the compounds of formulae (6) or (6a)–(6k) proceeds in general quantitatively, the structure of the modified polymers is determined mainly by the stoichiometry of the reactants that are employed into the reaction.

A particularly preferred polyionic material is polyallylamine gluconolactone, as shown in formula 7. Particularly preferred is a polyallyl amine wherein about 20 to 80% of the amino groups have been reacted with delta-glucolactone to yield R groups of the formula shown in formula 7.

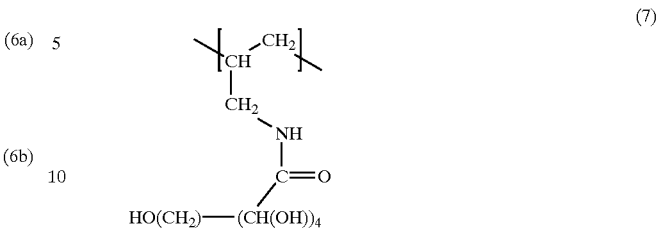

(7)

In a preferred embodiment, the surface treatment methods of the present invention involve the steps of (a) applying a coating of a cationic PEI, (b) applying a coating of an anionic PAA, and (c) applying a cationic layer of polyallyl amine gluconolactone. In another preferred embodiment, steps (b) and (c) are repeated a plurality of times, preferably about 2 to 7 times, more preferably about 3 to 5 times.

C. Coating Functions, Characteristics and Theory

Separate from the charged nature of the polyionic material, a wide variety of polyionic materials may be useful in producing a wide variety of product properties. For example, for extended wear contact lenses, particularly preferred polyionic materials are hydrophilic, or those which generate a hydrophilic surface coating, in order to inhibit adhesion of the lens to the surface of the wearer's eyes. Another class of polyionic materials useful for biomedical applications generally, and ophthalmic lenses in particular, are those which exhibit antimicrobial properties. Antimicrobial polyionic materials include polyquatemary ammonium compounds, such as those described in U.S. Pat. No. 3,931,319, issued to Green, et al. (e.g., POLYQUAD®). Yet another class of polyionic materials useful for ophthalmic lenses are those having radiation-absorbing properties, such as visibility tinting agents, iris color modifying dyes, and ultraviolet (UV) light tinting dyes. Still a further example of useful coating materials are those polyionic materials which inhibit or induce cell growth. Cell growth inhibitors would be useful in devices which are exposed to human tissue for an extended time with an ultimate intention to remove (e.g., catheters), while cell growth inducing polyionic materials would be useful in permanent implant devices (e.g., artificial corneas). Yet a further potential functional class of coating materials are those which absorb radiation, e.g., ultraviolet (UV) light blockers. There are a number of other biomedical applications of the present coatings processes, and a person having ordinary skill in the art could conceive of these without departing from the spirit. and scope of the present invention.

The processes of the present invention allow for production of an ophthalmic lens having a core material and a surface coating. The surface coating includes at least one layer of polyelectrolytes, and in a preferred embodiment, at least one bilayer. A bilayer includes a first polyionic material which is bonded to the core material and a second polyionic material, having charges opposite of the charges of the first polyionic material, which is bonded to the first polyionic material.

It has been unexpectedly found that polymeric materials which have no theoretical ionic charges on their surfaces, or no substantial amount of actual charges, may be coated in accordance with the present process. Teachings of in the electronics industry of methods of dip-coating electronics components into solutions of polyionic materials indicate highly charged surfaces (e.g., glass) are required for proper adhesion of charged polymeric materials. However, it has been found that multiple layers of wear-resistant coatings may be deposited onto contact lens surfaces which are not highly charged, and even on surfaces which have no substantial theoretical charge density. It was quite unexpected to find that no preliminary treatments (e.g., plasma) were required to generate charges on the lens surface in order to ensure the charged polymers adhered to the lens surface.

Thus, one embodiment of the present invention is directed to coating core lens materials which have a surface charge density in the range of contact lenses (especially siloxane-containing lenses) in the absence of preceding surface treatments. Thus, one embodiment of the present invention is directed to coating core lens materials which have a surface charge density which is essentially unaltered, i.e., less than a surface charge density of a material which has been previously treated to increase charge density.

While the claimed invention is not limited to the theory developed to support this unexpected result, a proposed theory is presented herein in order to enable the reader to better understand the invention. The electronic component treatment art teaches that extensive surface preparation processes are required to produce a highly positively or negatively charged surface which will attract the oppositely charged groups of a polyionic coating material. However, it has been unexpectedly found that theses extensive pretreatment processes are unnecessary for ophthalmic lenses, and in fact, that uncharged or substantially uncharged surfaces may be coated by contacting the uncharged surface with a highly charged polyionic species. In view of this unexpected finding, it is believed that a very small number of charges may exist in a transitory or permanent disperse state in any material, such as a core lens material, and it is this small number of charges which allow the highly charged polyionic material to bind to the core lens material.

One proposed explanation is that the core lens material has a low density of transitory negative charges on surface, while polycationic material has a high density of permanent positive ions along the polymer backbone. While there are very few negative charges, and the charges are transitory in nature (i.e., a particular location is only charged for a small fraction of time), nonetheless it is believed that substantially all of negative charges are associated with a positive charge on polycationic material.

Further, it is believed that the overall number of transitory or permanent negative charges over the lens surface does not change substantially with time, i.e., the negative charge density on the surface is essentially constant, but the position or location may be transitory. Thus, while the negative charges may be transitory, i.e., the charges appear and disappear across the surface over time, the overall number of charges is essentially constant. In view of the unexpected experimental results, it is theorized that the if the location of negative charges on the surface is transitory, the transitory nature is not a problem for polycationic binding strength (i.e., coating durability) because as one negative charge disappears, and an ionic bond is lost, another negative charges appears elsewhere, and another ionic bond is formed with the polycationic material.

Alternatively, the charges on the surface of the lens polymer may be permanent but highly disperse. Again, although the charge density is theoretically very low, whether permanent or transitory in nature, it has been unexpectedly found that this very low charge density is still sufficient to allow the polyelectrolyte material to bind to the surface of the lens with sufficient strength for ophthalmic applications. Namely, subsequent cleaning and disinfecting of the lens, as well as wearing and handling of the lens, with the associated and unavoidable surface abrasion, does not substantially damage the polyelectrolyte coatings of the present invention.

However, in order to compensate for the low charge density of the core lens polymer, the charge density of the polyionic coating material is preferably relatively high.

The charge density of the polyionic material may be determined by any of a number of means known in the art. For example, the charge density may be determined by Streming Zeta Potential.

D. Solution Characteristics and Application

The concentration of the spray or dip solution may vary depending on the particular polyionic materials involved, the desired coating thickness, and a number of other factors. However, it is generally preferred to formulate a relatively dilute aqueous solution of polyionic material. A preferred polyionic material concentration is about 0.001 to about 0.25 weight percent, more preferably about 0.005 to about 0.10%, and most preferably about 0.01 to about 0.05%.

In order to maintain the polyionic material in a highly charged state, the pH of the dilute polyionic solution should be maintained at about 2 to about 5, more preferably about 2.5 to about 4.5.

The rinsing solution is preferably an aqueous solution buffered at a pH of about 2 to about 7, more preferably about 2 to about 5, and even more preferably about 2.5 to about 4.5, in order to enhance the binding of the polyionic material to the core or underlyin polyionic material.

Partial drying or removal of excess rinsing solution from the surface between solution applications may be accomplished by a number of means known in the art. While the lens may be partially dried by merely allowing the lens to remain in an air atmosphere for a certain period of time, it is preferable to accelerate the drying by application of a mild stream of air to the surface. The flow rate may be adjusted as a function of the strength of the material being dried and the mechanical fixturing of the material (i.e., excessive flow rates may damage the lens or dislodge the lens from the retaining means).

It should be noted that there is no requirement to completely dry the lens. The "partial drying" step, as used herein, refers to a removal of droplets of solution which cling to the lens surface, rather than a desiccation of the lens. Thus, it is preferred to dry only to the extent that any water or solution film on the surface is removed.

The thickness of the coating may be adjusted by addition of one or more salts, such as sodium chloride, to the polyionic solution. A preferred salt concentration is about 0.1 to about 2.0 weight percent. As the salt concentration is increased, the polyelectrolyte takes on a more globular conformation. However, if the concentration is raised too high, the polyelectrolyte will not deposit well, if at all, on the lens surface. A more preferred salt concentration is about 0.7 to about 1.3 weight percent.

Thickness of the coatings may be determined by adding a dye to the polyionic solution, e.g. methylene blue dye. Increases in visible light absorption correlate with increases in coating thickness. In addition, ellipsometry measurements may be used to measure the coating thickness. For hydrophilic surface modification, measurement of the contact angle of water applied to the surface gives a relative indication of surface hydrophilicity. As contact angle decreases, hydrophilicity increases.

II. Suitable Ophthalmic Lens Core Materials

The polymeric material forming the ophthalmic lenses used in accordance with the present invention may be any of a wide variety of polymeric materials. However, a preferred group of materials are those materials which are highly oxygen permeable, such as fluorine- or siloxane-containing polymers. In particular, the polymeric materials described U.S. Pat. No. 5,760,100, issued to Nicolson, et al. On Jun. 2, 1998 are an exemplary group, and the teachings of this patent are incorporated herein by reference. For convenience of the reader, examples of suitable materials are disclosed herein, without limitation thereto.

A. Material "A"

One embodiment of a suitable core material of the present ophthalmic lenses is a copolymer formed from the following monomeric and macromeric components:

(a) about 5 to about 94 dry weight percent of a macromer having the segment of the formula

CP-PAO-DU-ALK-PDMS-ALK-DU-PAO-CP where

PDMS is a divalent poly(disubstituted siloxane),

ALK is an alkylene or alkylenoxy group having at least 3 carbon atoms,

DU is a diurethane-containing group,

PAO is a divalent polyoxyalkylene, and

CP is selected from acrylates and methacrylates, wherein said macromer has a number-average molecular weight of 2000 to 10,000;

(b) about 5 to about 60 weight percent methacryloxypropyltris(trimethylsiloxy)silane;

(c) about 1 to about 30 weight percent of an acrylate or methacrylate monomer; and (d) 0 to 5 weight percent cross-linking agent, with the weight percentages being based upon the dry weight of the polymer components.

A preferred polysiloxane macromer segment is defined by the formula

CP-PAO-DU-ALK-PDMS-ALK-DU-PAO-CP where

PDMS is a divalent poly(disubstituted siloxane);

CP is an isocyanatoalkyl acrylate or methacylate, preferably isocyanatoethyl methacrylate, where the urethane group is bonded to the terminal carbon on the PAO group;

PAO is a divalent polyoxyalkylene (which may be substituted), and is preferably a polyethylene oxide, i.e., (—CH$_2$—CH$_2$—O—)$_m$CH$_2$CH$_2$— where m may range from about 3 to about 44, more preferably about 4 to about 24;

DU is a diurethane, preferably including a cyclic structure,
where an oxygen of the urethane linkage (1) is bonded to the PAO group and an oxygen of the urethane linkage (2) is bonded to the ALK group;

and ALK is an alkylene or alkylenoxy group having at least 3 carbon atoms, preferably a branched alkylene group or an alkylenoxy group having 3 to 6 carbon atoms, and most preferably a sec-butyl (i.e., —CH$_2$CH$_2$CH(CH$_3$)—) group or an ethoxypropoxy group (e.g., —O—(CH$_2$)$_2$—O—(CH$_2$)$_3$—).

B. Material "B": Polysiloxane-comprising Perfluoroalkyl Ethers

The Material "B" macromer is defined by formula (I):

$$P_1—(Y)_m—(L—X_1)p—Q—(X_1—L)_p—(Y)_m—P_1 \quad (I)$$

where each P1, independently of the others, is a free-radical-polymerizable group;

each Y, independently of the others, is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

each L, independently of the others, is a divalent radical of an organic compound having up to 20 carbon atoms;

each $X_1$, independently of the others, is —NHCO—, —CONH—, —NHCONH—, —COO—, —OCO—, —NHCOO— or —OCONH—; and Q is a bivalent polymer fragment consisting of the segments:

(a) —(E)$_k$—Z—CF$_2$—(OCF$_2$)$_x$—(OCF$_2$CF$_2$)$_y$—OCF$_2$—Z—(E)$_k$—, where x+y is a number in the range of 10 to 30;

each Z, independently of the others, is a divalent radical having up to 12 carbon atoms or Z is a bond;

each E, independently of the others, is —(OCH$_2$CH$_2$)$_q$—, where q has a value of from 0 to 2, and where the link —Z—E— represents the sequence —Z—(OCH$_2$CH$_2$)$_q$—; and k is 0 or 1;

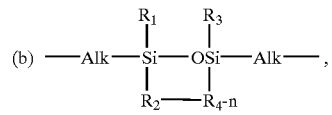

where n is an integer from 5 to 100;

Alk is alkylene having up to 20 carbon atoms;

80–100% of the radicals $R_1$, $R_2$, $R_3$ and $R_4$, independently of one another, are alkyl and 0–20% of the radicals $R_1$, $R_2$, $R_3$ and $R_4$, independently of one another, are alkenyl, aryl or cyanoalkyl; and (c) $X_2$—R—$X_2$, where R is a divalent organic radical having up to 20 carbon atoms, and each $X_2$, independently of the others, is —NHCO—, —CONH—, —NHCONH—, —COO—, —OCO—, —NHCOO— or OCONH—;

with the provisos that there must be at least one of each segment (a), (b), and (c) in Q, that each segment (a) or (b) has a segment (c) attached to it, and that each segment (c) has a segment (a) or (b) attached to it.

The number of segments (b) in the polymer fragment Q is preferably greater than or equal to the number of segments (a). The ratio between the number of segments (a) and (b) in the polymer fragment Q is preferably 3:4, 2:3, 1:2 or 1:1. The molar ratio between the number of segments (a) and (b) in the polymer fragment Q is more preferably 2:3, 1:2 or 1:1.

The mean molecular weight of the polymer fragment Q is in the range of about 1000 to about 20000, preferably in the range of about 3000 to about 15000, particularly preferably in the range of about 5000 to about 12000.

The total number of segments (a) and (b) in the polymer fragment Q is preferably in the range of 2 to about 11, particularly preferably in the range of 2 to about 9, and in particular in the range of 2 to about 7. The smallest polymer unit Q is preferably composed of one perfluoro segment (a), one siloxane segment (b) and one segment (c).

C. Material "C"

Material "C" polymers are formed by polymerizing polymerizable macromers which contain free hydroxyl groups. Macromers which are built up, for example, from an aminoalkylated polysiioxane which is derivatized with at least one polyol component containing an unsaturated polymerizable side chain are disclosed. Polymers can be prepared on the one hand from the macromers according to the invention by homopolymerization. The macromers mentioned furthermore can be mixed and polymerized with one or more hydrophilic and/or hydrophobic comonomers. A special property of the macromers according to the invention is that they function as the element which controls microphase separation between selected hydrophilic and hydrophobic components in a crosslinked end product. The hydrophilichydrophobic microphase separation is in the region of less than 300 nm. The macromers are preferably crosslinked at the phase boundaries between, for example, an acrylate comonomer on the one hand and an unsaturated polymerizable side chain of polyols bonded to polysiloxane on the other hand, by covalent bonds and additionally by reversible physical interactions, for example hydrogen bridges. These are formed, for example, by numerous amide or urethane groups. The continuous siloxane phase which exists in the phase composite has the effect of producing a surprisingly high permeability to oxygen.

The Material "C" polymers are formed by polymerizing a macromer comprising at least one segment of the formula (I):

(I)

in which (a) is a polysiloxane segment,
(b) is a polyol segment which contains at least 4 C atoms, Z is a segment (c) or a group $X_1$,
(c) is defined as $X_2$—R—$X_2$, wherein
R is a bivalent radical of an organic compound having up to 20 C atoms and
each $X_2$ independently of the other is a bivalent radical which contains at least one carbonyl group,
$X_1$ is defined as $X_2$, and
(d) is a radical of the formula (II):

$$X_3-L-(Y)_k-P_1 \quad (II)$$

in which $P_1$ is a group which can be polymerized by free radicals;
Y and $X_3$ independently of one another are a bivalent radical which contains at least one carbonyl group;
k is 0 or 1; and
L is a bond or a divalent radical having up to 20 C atoms of an organic compound.

A polysiloxane segment (a) is derived from a compound of the formula (III):

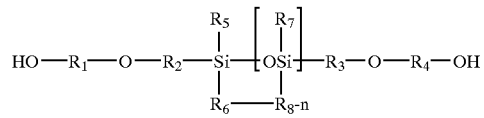
(III)

in which n is an integer from 5 to 500;
99.8–25% of the radicals $R_1$, $R_2$, $R_3$, $R_4$, $R_5$ and $R_6$ independently of one: another are alkyl and 0.2–75% of the radicals $R_1$, $R_2$, $R_3$, $R_4$, $R_5$ and $R_6$ independently of one another are partly fluorinated alkyl, aminoalkyl, alkenyl, aryl, cyanoalkyl, alk-NH-alk-$NH_2$ or alk-$(OCH_2)_m$—$(OCH_2)p$—$OR_7$,
$R_7$ is hydrogen or lower alkyl, alk is alkylene, and
m and p independently of one another are an integer from 0 to 10, one molecule containing at least one primary amino or hydroxyl group.

The alkylenoxy groups —$(OCH_2CH_2)_m$ and —$(OCH_2)_p$ in the siloxane of the formula (III) are either distributed randomly in a ligand alk-$(OCH_2CH_2)_m$—$(OCH_2)_p$—$OR_7$ or are distributed as blocks in a chain.

A polysiloxane segment (a) is linked a total of 1–50 times, preferably 2–30 times, and in particular 4–10 times, via a group Z with a segment (b) or another segment (a), Z in an a-Z-a sequence always being a segment (c). The linkage site in a segment (a) with a group Z is an amino or hydroxyl group reduced by one hydrogen.

D. "Material D"

Another useful core material involves the polymerization of a siloxane-containing macromer which is formed from a poly(dialkylsiloxane) dialkoxyalkanol having the following structure:

where n is an integer from about 5 to about 500, preferably about 20 to 200, more preferably about 20 to 100;
the radicals $R_1$, $R_2$, $R_3$, and $R_4$, independently of one another, are lower alkylene, preferably $C_1$–$C_6$ alkylene, more preferably $C_1$–$C_3$ alkylene, wherein in a preferred embodiment, the total number of carbon atoms in $R_1$ and $R_2$ or in $R_3$ and $R_4$ is greater than 4; and
$R_5$, $R_6$, $R_7$, and $R_8$ are, independently of one another, are lower alkyl, preferably $C_1$–$C_6$ alkyl, more preferably $C_1$–$C_3$ alkyl.

The general structure of the Material D macromer follows:

ACRYLATE-LINK-ALK-O-ALK-PDAS-ALK-O-ALK-LINK-ACRYLATE where the ACRYLATE is selected from acrylates and methacrylates; LINK is selected from urethanes and dirurethane linkages, ALK-O-ALK is as defined above ($R_1$—O—$R_2$ or $R_3$O—$R_4$), and PDAS is a poly(dialkylsiloxane).

For example, a Material D macromer may be prepared by reacting isophorone diisocyanate, 2-hydroxyethyl(meth)acrylate and a poly(dialkylsiloxane)dialkoxyalkanol in the presence of a catalyst.

III. Biomedical Products

In addition to the coated ophthalmic lenses described herein above, the present invention may be applied in alternative ways in a biomedical (e.g., ophthalmic lens) manufacturing environment. For example, one or more polyionic materials may be added to the ophthalmically compatible solution in which a contact lens is stored after manufacturing.

Subsequent to molding a contact lens, the lens may be subjected to several post-molding treatments including, for example, additional curing steps, extraction, inspection and edging. Ultimately, the lens will be placed into a container or package with a sterile, ophthalmically compatible solution for storage. In accordance with the present invention, a polyionic material may be added to the storage solution, either before or after sterilization. In a preferred embodiment, a storage solution including a polyionic material is added to a lens container along with a contact lens, the container is sealed, and the container is subjected to a sterilization process (e.g., autoclaving).

Thus, an embodiment of the invention is an ophthalmic product that includes packaging retaining a contact lens and a sterile ophthalmically compatible solution, which includes a polyionic material, a tonicity adjusting agent (e.g., sodium chloride to produce a substantially isotonic solution) and water.

Another exemplary utility of the present invention is to provide a means for attaching materials to the surface of a biomedical device. More specifically, the methods of the present invention may be used to form a polyionic coating on a biomedical device, and another material may then be affixed to the polyionic coating via a number of means, such as chemical reaction via functional groups.

For example, a poly(ethyleneimine) [PEI] coating may be deposited onto the surface of a contact lens via the methods described herein. Utilizing the amine functional groups, another material (e.g., hyaluronic acid), having chemical groups reactive with amine groups, may be chemically bonded to the PEI coating.

Thus, yet another embodiment of the invention is a method of altering the surface of a material by applying a polyionic coating having functional groups to the surface and subsequently contacting the polyionic coating with a second coating material having groups reactive with the functional groups, thereby chemically reacting the groups and bonding the second coating material to the polyionic coating. Clearly, a number of surface treatment regimes may be envisioned given the teachings of this dual treatment method, and such regimes are within the scope of the invention.

Still a further embodiment of the invention relates to the insertion of intraocular lenses into the eye. Intraocular lenses (IOLs), as used herein, include lenses which are designed to replace the crystalline lens in the capsule sac of the eye (e.g., used in cataract surgery) and refractive lenses designed for vision correction and placed in the posterior or anterior chamber of the eye. The polyionic materials and methods disclosed herein may be used to coat the insert guides, plungers, triggers and IOL assemblies to reduce friction or increase lubricity. Increased lubicity may reduce the difficulty which the ophthalmologist experiences when attempting to insert the IOL into the eye.

IV. Manufacturing Processes

The present invention may also be utilized more generally in the manufacturing of biomedical articles, such as ophthalmic lenses, wound dressings, transdermal drug delivery devices, and the like polymeric-based materials.

For example, the present invention may be used to surface treat a fixture which supports an article during a manufacturing process. The surface treatment may be useful in increasing lubricity of the surfaces of the fixture which contact the article, thereby reducing adhesion or promoting separation of the article from the fixture. Alternatively, the surface treatment may increase adherence of or attraction of the fixture surface to the article, thereby aiding in retaining the article on the fixture during a transportation or indexing step in the manufacturing process. A number of other functions of the surface treatment may be envisioned, such as antimicrobial activity and antifouling.

Thus, another embodiment of the invention is a fixture for supporting an article which is coated with a polyionic material. The fixture surface should be formed from a material having a plurality of transitory or permanent charges on or near the surface of the material. The polyionic material may be affixed to the surface by contacting therewith via any number of methods described hereinabove.

Another exemplary use of the present invention in a manufacturing setting involves the coating of a mold used to define the shape of an article. The mold may be coated for a number of purposes, including importantly, quick-release from the molded article after the article is formed. The mold may be coated by any of the previously-mentioned methods. Therefore, another embodiment of the invention is a mold for manufacturing an article, including a material having a plurality of transitory or permanent charges on or near the surface of the material and a surface coating, including a polyionic material which is bonded to the core material.

Still another method of utilizing the present technology in a manufacturing setting can be termed the transfer grafting of a polyionic coating. In this embodiment, the mold is coated with a polyionic material as described above, but at least a portion of the coating is transferred from the mold when the liquid molding material (e.g., polymerizable material) is dispensed into the mold for formation of the solid article. Hence, another embodiment of the invention is a method of forming an article and coating the article by transfer grafting a coating material from the mold in which the article was produced. This method includes the steps of applying a coating of a polyionic material to a mold by contacting at least a portion of the mold with a solution of polyionic material, dispensing a liquid molding material into the mold, thereby contacting said liquid molding material with said coating, allowing the mold coating to contact the liquid molding material for a time sufficient for at least a portion of the coating to transfer from the mold to the molding material, and causing the liquid mold material to harden (e.g., by polymerization via application of UV light).

The previous disclosure will enable one having ordinary skill in the art to practice the invention. In order to better enable the reader to understand specific embodiments and the advantages thereof, reference to the following examples is suggested.

EXAMPLE 1

Siloxane-containing contact lenses were prepared in substantial accordance with the teachings regarding "Material B" of PCT Publication No. WO 96/31792 by inventors Nicolson, et al. at pages 30–41, with a prepolymerization mixture having weight percentages of 50% macromer, 20% TRIS, 29.5% DMA, and 0.5% Darocur 1173. The contact lenses were extracted and autoclaved. The average (n=20) contact angle (Sessle Drop), as measured by a VCA 2500 XE contact angle measurement device (AST, Inc., Boston, Mass.) was about 111. Results are reported in Table A.

EXAMPLE 2

A lens prepared in accordance with Example 1 was surface treated with a layer-by-layer (LBL) process to increase the hydrophilicity of the lens as follows.

A dilute ($10^{-2}$ molar) aqueous stock solution of poly (allylamine hydrochloride) (50–60,000 $MW_n$ from Aldrich Chemicals) [PAH] was prepared by adding 1.3 grams of PAH to 1400 ml of deionized water. The pH was adjusted to about 2.5 by dropwise addition of hydrochloric acid.

A dilute ($10^{-2}$ molar) aqueous stock solution of poly (acrylic acid) (50–60,000 $MW_n$ from PolyScience) [PAA]

was prepared by adding 4.03 grams of PAA to 1400 ml of deionized water. The pH was adjusted to about 4.5 by dropwise addition of hydrochloric acid.

The solution concentrations were chosen in an attempt to maintain the concentration of positively charged units the same as the concentration of negatively charged units.

The contact lens was immersed into the PAH application solution for a period of about 15 minutes. After removal from the PAH solution, the lens was immersed in three baths of deionized water adjusted to a pH of 2.5 (the same pH as the PAH application solution) for two minute periods. Rinsing solution adhering to the lens was dislodged by application of a mild air stream (referred to as "drying" herein).

Next the lens was immersed into the PAA solution for a period of about 15 minutes, rinsed and dried as described above.

The coating and rinsing steps were repeated an additional four times, but the drying steps were dispensed with during these coating steps.

The average (n=4) contact angle was 78. Results are reported in Tables A and B.

EXAMPLE 3

Coated lenses as treated in Example 2 were treated by dropwise addition of 2 ml of $CaCl_2$ solution (9 volume percent), a strongly ionic solution, in order to determine coating durability. The lenses were dried with mild air.

The average (n=6) contact angle was 72. Results are reported in Table B.

EXAMPLE 4

A lens prepared in accordance with Example 1 is surface treated with a layer-by-layer (LBL) process to increase the hydrophilicity in accordance with the procedures outlined in Example 2, with the following exception: the application and rinsing solution pH for the PAA solution was 2.5, as opposed to 4.5 in Example 2.

The average (n=4) contact angle was 65. Results are reported in Tables A and B.

EXAMPLE 5

Coated lenses as treated in Example 4 were treated by dropwise addition of 2 ml of $CaCl_2$ solution. The lenses were dried with mild air.

The average (n=4) contact angle was 76. Results are reported in Table B.

EXAMPLE 6

A lens prepared in accordance with Example 1 is surface treated with a layer-by-layer (LBL) process to increase the hydrophilicity.

A dilute ($10^{-2}$ molar) aqueous stock solution of poly (ethyleneimine) (50–60,000 $MW_n$ from PolyScience) [PEI] was prepared by adding 2.00 grams of PAH to 1400 ml of deionized water. The pH was adjusted to about 2.5 by dropwise addition of hydrochloric acid.

A dilute PAA solution was prepared as in Example 2. The pH was adjusted to about 2.5 by dropwise addition of hydrochloric acid.

The contact lens was immersed into the PEI application solution, rinsed and dried as described in Example 2, followed by a similar treatment with the PAA solution.

The coating and rinsing steps were repeated an additional four times, but the drying steps were dispensed with during these coating steps.

The average (n=6) contact angle was 57. Results are reported in Tables A and B.

EXAMPLE 7

Coated lenses as treated in Example 6 were treated by dropwise addition of 2 ml of $CaCl_2$ solution. The lenses were dried with mild air.

The average (n=4) contact angle was 77. Results are reported in Table B.

EXAMPLE 8

A lens prepared in accordance with Example 1 is surface treated with a layer-by-layer (LBL) process to increase the hydrophilicity in accordance with the procedures outlined in Example 6, with the following exception: the application and rinsing solution pH for the PAA solution was 4.5, as opposed to 2.5 in Example 6.

The average (n=4) contact angle was 72. Results are reported in Tables A and B.

EXAMPLE 9

Coated lenses as treated in Example 8 were treated by dropwise addition of 2 ml of $CaCl_2$ solution. The lenses were dried with mild air.

The average (n=4) contact angle was 112. Results are reported in Table B.

TABLE A

| Example (run) | Primary Application | | Application Solution pH | | Rinse Solution pH | | Primary Application Drying | | Secondary Application | | No. of sets of Secondary Applications | Secondary Applications Drying | | Salt | Avg. Contact Angle |
|---|---|---|---|---|---|---|---|---|---|---|---|---|---|---|---|
| | (+) | (−) | (+) | (−) | (+) | (−) | (+) | (−) | (+) | (−) | | (+) | (−) | | |
| 1 | none | None | | | | | | | | | | | | | 111 |
| 2 | PAH | PAA | 2.5 | 4.5 | 2.5 | 4.5 | yes | yes | PAH | PAA | 4 | no | no | no | 78 |
| 3 | PAH | PAA | 2.5 | 2.5 | 2.5 | 2.5 | yes | yes | PAH | PAA | 4 | no | no | no | 65 |
| 4 | PEI | PAA | 2.5 | 2.5 | 2.5 | 2.5 | yes | yes | PAH | PAA | 4 | no | no | no | 57 |
| 5 | PEI | PAA | 2.5 | 4.5 | 2.5 | 4.5 | yes | yes | PAH | PAA | 4 | no | no | no | 72 |

TABLE B

| Coating | | Coating with CaCl₂ Treatment | |
|---|---|---|---|
| Example | Contact Angle | Example | Contact Angle |
| 2 | 78 | 3 | 72 |
| 3 | 65 | 5 | 76 |
| 4 | 57 | 7 | 77 |
| 5 | 72 | 9 | 112 |

DISCUSSION OF RESULTS

EXAMPLES 1–9

A comparison of contact angles of treated lenses in Examples 2, 4, 6 and 8 with the contact angle of untreated lenses in Example 1 illustrates that a surface modification has occurred or a coating has been deposited (See Table A). In addition, all of the treated lenses had significantly reduced contact angles, demonstrating that the hydrophilicity of the surface had been significantly increased.

Further, a comparison of contact angles of coated lenses in Examples 2, 4, 6 and 8 with the similarly treated lenses in Examples 3, 5, 7 and 9 which have been exposed to a strong ionic solution shows, with the exception of Examples 8 and 9, that the contact angles have not changed substantially. Thus, the surface modification or coating is unexpectedly quite durable in the presence of a highly charged solution which would be expected to dislodge charge attractions between the polyionic coating materials and the contact lens surface.

EXAMPLE 10

A lens prepared in accordance with Example 1 was surface treated with an LBL process to functionalize the surface of the lens as follows. Subsequently, active species were attached to the lens via the functional groups provided by the LBL coating.

The lens was treated substantially in accordance with the methods described in the prior examples. The coating solutions included a first immersion in PEI at a pH of 3.5, a second immersion in PAA at a pH of 2.5 and a final immersion in PEI, again at a pH of 3.5.

Subsequent to LBL coating, the lenses were immersed in a solution of hyaluronic acid. It is believed that the hyaluronic acid reacted with the free amine groups on the PEI coating, thereby bonding the hyaluronic acid to the surface of the contact lens.

EXAMPLE 11

A lens prepared in accordance with Example 1 as surface treated with an LBL process to functionalize the surface of the lens as follows. Subsequently, active species were attached to the lens via the functional groups provided by the LBL coating.

The lens was treated substantially in accordance with the methods described in the prior examples. The coating solutions included a first immersion in PEI (pH 3.5), a second immersion in PAA (pH 2.5), a third immersion in PEI, a fourth immersion in PAA and a final immersion in PEI. A 2.5 bilayer structure was thus formed.

Subsequent to LBL coating, the lenses were immersed in a solution of hyaluronic acid. It is believed that the hyaluronic acid reacted with the free amine groups on the final PEI layer, thereby bonding the hyaluronic acid to the surface of the contact lens.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, definitions or the like are provided to enhance the reader's comprehension of this document, and should not be read as limiting the scope of the present invention. Accordingly, the intellectual property rights to this invention are defined only by the following claims and reasonable extensions and equivalents thereof.

What is claimed is:

1. A method producing a biomedical device having a core material and a surface coating comprising at least one bilayer of polyionic materials, comprising the steps of:
    (a) contacting a core material with a first polyionic material, thereby bonding said polyionic material to said core material to form a coated device; and
    (b) contacting said coated device with a second polyionic material having charges opposite of the charges of said first polyionic material, thereby forming a device having a polyelectrolyte bilayer.

2. A method of claim 1, wherein said biomedical device is an ophthalmic lens.

3. A method of claim 2, comprising the steps of:
    (a) applying a coating of a first polyionic material to a core lens by immersing said lens in a first solution of a first polyionic material;
    (b) rinsing said lens by contacting said lens with a rinsing solution;
    (c) applying a coating of a second polyionic material to said lens by immersing said lens in a second solution of a second polyionic material, wherein said second polyionic material has charges opposite of the charges of the first polyionic material; and
    (d) rinsing said lens by contacting said lens with a rinsing solution.

4. A method of claim 3, wherein at least one of said contacting occurs by immersing said lens in a solution.

5. A method of claim 3, wherein at least one of said contacting occurs by spraying solution onto said lens.

6. A method of claim 3, wherein the pH of the polyionic solutions are between 2 and 5.

7. A method of claim 3, wherein said rinsing solutions each have a pH which is within one pH unit from the pH of the prior applied polyionic solution.

8. A method of claim 2, comprising the steps of:
    (a) applying a coating of a first polyionic material to a core lens by contacting said lens with a first solution of a first polyionic material;
    (b) rinsing said lens by contacting said lens with a rinsing solution;
    (c) drying said lens;
    (d) applying a coating of a second polyionic material to said lens by contacting said lens with a second solution of a second polyionic material, wherein said second polyionic material has charges opposite of the charges of the first polyionic material;

(e) rinsing said lens by contacting said lens with a rinsing solution; and (f) drying said lens.

9. A method of claim 8, wherein at least one of said contacting occurs by immersing said lens in a solution.

10. A method of claim 8, wherein at least one of said contacting occurs by spraying said lens with solution.

11. A method of claim 1, wherein no pretreatment is applied to increase the charge density of the material.

12. A method of claim 1, wherein said method comprises repeating steps (a) through (f) between 5 and 20 times.

13. A method of claim 3, wherein said method comprises repeating steps (a) and (b) between 5 and 20 times.

14. A method producing an article having a core material and a surface coating, comprising the steps of:

(a) contacting an article with a cationic polyionic material, thereby bonding said cationic polyionic material to said article;

(b) contacting said article with an anionic polyionic material, thereby bonding said anionic polyionic material to said cationic polyionic material;

(e) contacting said article with a polyallyl amine gluconolactone, thereby bonding said polyallyl amine gluconolactone to said anionic polyionic material.

15. A method of claim 14, wherein steps (b) and (c) are repeated a plurality of times.

16. A method of claim 14, wherein steps (b) and (c) are repeated about 2 to 7 times.

* * * * *